United States Patent [19]

Iwaki et al.

[11] Patent Number: 5,099,189
[45] Date of Patent: Mar. 24, 1992

[54] ALTERNATING CURRENT GENERATOR FOR VEHICLE

[75] Inventors: Yoshiyuki Iwaki; Kazutoshi Kaneyuki; Shiro Iwatani, all of Himeji, Japan

[73] Assignee: Mitsubishi Denki Kabushiki Kaisha, Tokyo, Japan

[21] Appl. No.: 206,859

[22] PCT Filed: Sep. 30, 1987

[86] PCT No.: PCT/JP87/00724

§ 371 Date: May 31, 1988

§ 102(e) Date: May 31, 1988

[87] PCT Pub. No.: WO88/02566

PCT Pub. Date: Apr. 7, 1988

[30] Foreign Application Priority Data

Oct. 3, 1986 [JP] Japan .................. 61-236553
Nov. 27, 1986 [JP] Japan .................. 61-183310[U]

[51] Int. Cl.⁵ .................. H02J 7/14; H02P 9/30
[52] U.S. Cl. .................. 322/25; 322/27; 322/28; 322/73
[58] Field of Search .................. 361/18–21; 322/27, 28, 25, 73

[56] References Cited

U.S. PATENT DOCUMENTS

| 4,346,337 | 8/1982 | Watrous | 322/28 X |
| 4,570,198 | 2/1986 | Storti et al. | 322/27 X |
| 4,570,199 | 2/1986 | Morishita et al. | 361/18 |
| 4,629,966 | 12/1986 | Quantz | 322/28 X |
| 4,658,200 | 4/1987 | Kouge | 322/25 |
| 4,727,307 | 2/1988 | Keneyuki et al. | 322/25 X |
| 4,739,243 | 4/1988 | Iwatani et al. | 322/28 X |

Primary Examiner—R. J. Hickey
Attorney, Agent, or Firm—Burns, Doane Swecker & Mathis

[57] ABSTRACT

An alternating current generator for vehicles in which the exciting current flowing in the field winding (2) is detected and the current thus detected is suppressed not to exceed the maximum exciting current under the hot condition by the field current limiting circuit (5) for aiming at eliminating the generation of the maximum output under the cold condition to reduce the size of a pulley to result in a reduced vehicle weight and preventing the variation of the maximum output characteristic under the hot condition.

3 Claims, 3 Drawing Sheets

ALTERNATING CURRENT GENERATOR FOR VEHICLE

FIELD OF THE INVENTION

This invention relates to an alternating current (A.C.) generator to be installed on automobiles and the like.

DESCRIPTION OF THE PRIOR ART

FIG. 1 shows a circuit arrangement of a conventional A.C. generator, in which the reference numeral (1) denotes a three-phase output winding, (2) is a field winding mounted on the rotor of the generator, and (3) is a rectifying circuit for converting an A.C. output of the three-phase output winding (1) into a D.C. (direct current) voltage output, which is used for charging a battery and at the same time, supplied to an electric load. The reference numeral (31) denotes an auxiliary rectifying circuit for outputting of the A.C. output as an exciting current, and (4) is a voltage regulating circuit for regulating the exciting current for the field winding (2) to control the output voltage constant, which is composed of a power tranistor (41) to make and break the exciting current, a driver transistor (42), a zener diode (43) and a voltage detecting circuit (44).

In the A.C. generator thus constructed, when the field winding (2) is supplied with current with the generator rotatably driven, the maximum exciting current will be determined by the resistance value of the field winding (2), which causes the maximum output from the rectifying circuit. When the maximum output is not required, the voltage of the auxiliary rectifying circuit (31) rises to cause the potential of the detecting circuit (44) to increase, which then makes zener diode (43) conductive to turn off the power transistor (41).

With the exciting current for the field winding (2) reduces, the potential of the detecting circuit (44) is reduced to make the zener diode (43) non-conductive, which then causes the power transistor (41) to conduct. The repetition of the above mentioned operation will keep output voltage constant.

The output voltage of a generator of this kind has depended upon the maximum exciting current which is determined by the resistance of the field winding (2) as shown above, and the maximum exciting current varies as this resistance varies to result in changes in the maximum output. Out of these changes is related to the temperature of the field winding (2) to produce a cold output and a hot output. That is, if the charging generator starts running from its cold, shutdown condition when the temperature of the field winding (2) is equal to that of ambient air, an exciting current in response to the resistance of the field winding at that time will flow to produce the maximum output depending on this current. This is what is called the cold output. As the generator keeps running for a period of time, the resistance of the field winding (2) becomes increased by the heat generated in the field winding (2) by the exciting current passing through that resistance. The increase in resistance then causes the exciting current to decrease until heat generated and heat dissipated becomes in balance to produce a constant output. This is what is called the hot output. Generally speaking, it takes several minutes to several tens of minutes for the output to shift from cold to hot. As the torque required to drive the generator is proportional to this output, the design condition should be determined depending upon the cold output when the torque is applied through a pulley and the like which apt to slip against the applied torque and the size of a pulley to be used must be made large in size. FIG. 2 shows output characteristics of a generator of this kind, in which (401) is a cold output characteristic at an ambient temperature of 20° C., (411) is a driving torque characteristic corresponding to this cold output characteristic, (402) is a hot output characteristic at an ambient temperature of 20° C., (412) is a driving torque characteristic under the hot condition, (403) is a cold output characteristic at an ambient temperature of 120° C., and (404) is a hot output characteristic at an ambient temperature of 120° C. The output characteristic (401) is transient in nature which is observed immediately after the starting of vehicles and is not usually required for the same. However, to transmit a torque having the driving torque characteristic (411) corresponding to this cold output characteristic necessitates to use a pulley of 60 mm of outer diameter for example. That is, a pulley large enough for the cold condition has to be provided, which result in a large and heavy generating system. Conversely, when an ambient temperature rises more than a certain level, the design for the cold condition will cause an insufficient output for the required output characteristic (405).

The other changes is caused by changes in the ambient temperature around the generator. When atmospheric temperature is 20° C., the ambient temperature around the engine of a vehicle will change in the range of 20° C. to 120° C. The change in the ambient temperature varies the resistance value of the field winding (2), which causes the output to change. This is so called the characteristic depending on ambiance of the output and the higher the ambient temperature, the greater the output decreases. Since a fixed amount of electric load is required for a vehicle under any ambient temperature, it is generally necessary to provide an output with the ambient temperature rise taken into consideration.

The present invention therefore aims at eliminating the above mentioned problems and providing an improved A.C. generator for vehicles in which the maximum output is keep constant without the cold output generated transiently and the output will not change by variation in the ambient temperature.

SUMMARY OF THE INVENTION

It is an object of the present invention to provide an improved A.C. generator for vehicles provided with a field current limiting circuit to suppress the maximum value of the exciting current fed to the field winding so that the generation of the maximum output under the cold condition is eliminated.

According to the present invention, no output of the generator under the cold condition will be greater than the output under the hot condition so that a device such as a driving pulley specifically designed for the cold condition need not be provided. This will reduce the weight of a vehicle on which the generator is to be installed and a stable generator output which is not affected by the ambient temperature can be obtained.

MOST PREFERRED EMBODIMENTS FOR ENFORCING INVENTION

The present invention will not be explained referring to the accompanying drawings to make the same more precisely understood.

Figure 1:
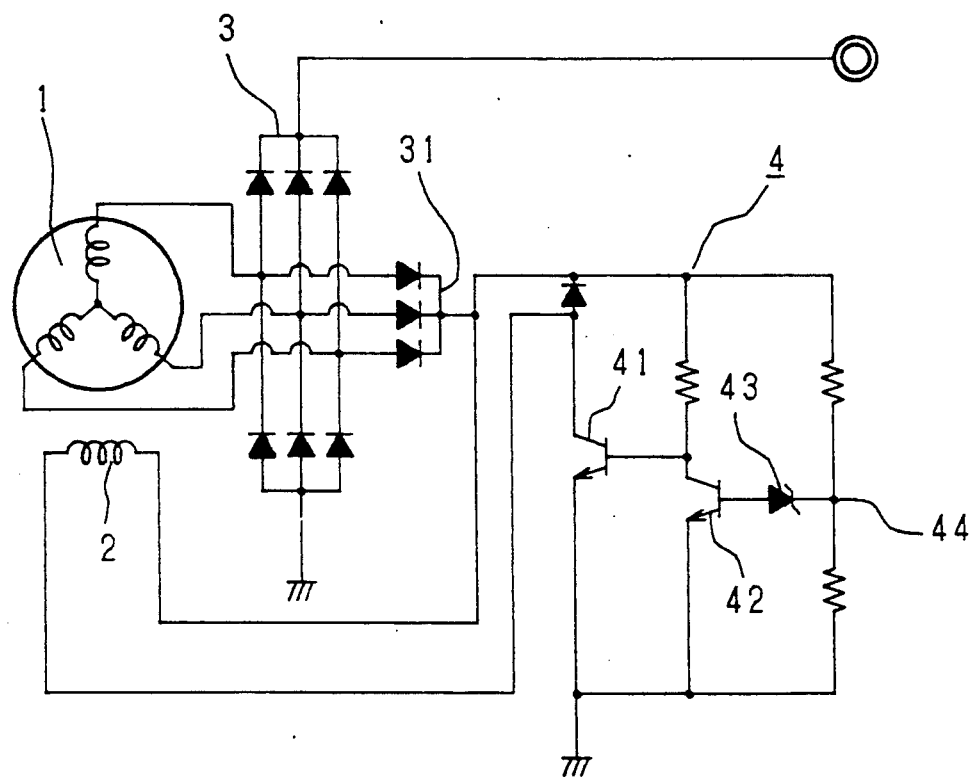
FIG. 1 is a circuit diagram showing a conventional A.C. generator for vehicles.
Figure 2:
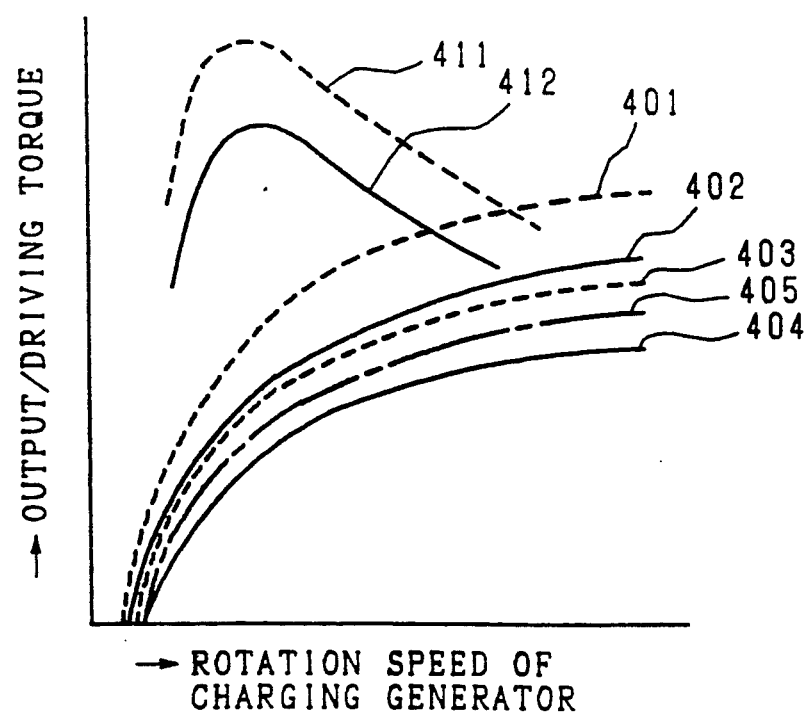
FIG. 2 is a characteristic chart showing output characteristics of the generator shown in FIG. 1.
Figure 3:
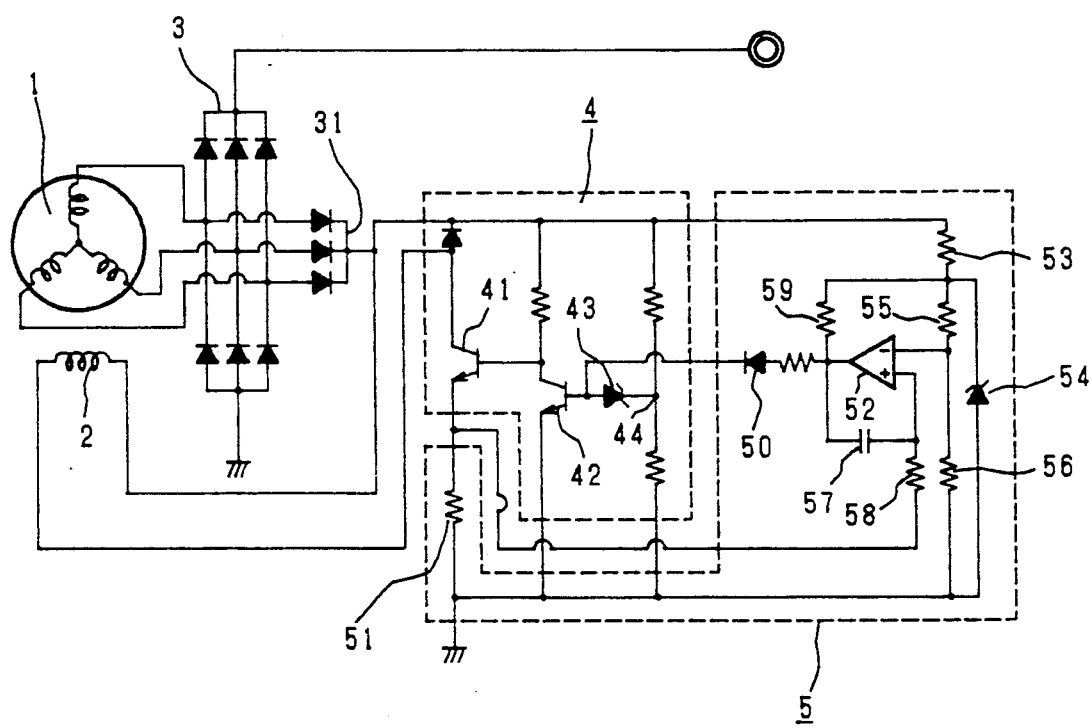
FIG. 3 is a circuit configuration diagram showing an embodiment of the A.C. generator for vehicles to the present invention.

FIG. 3 shows an embodiment of the A.C. generator for vehicles according to the present invention, in which elements corresponding to those shown in FIG. 1 are denoted by the same reference numerals and the description thereof is not repeated. The reference numeral (5) shows a field current limiting circuit which constitutes the main element of the present invention and is composed of the following components:

The reference numeral (51) denotes a current detecting resistor which is connected between the emitter of a power transistor (41) and ground, and is provided to detect the exciting current flowing in a field winding (2); (52) shows a comparator which is composed to make a driver transistor (42) conductive to cause the power transistor (41) to turn off when current flowing in it exceeds a predetermined level; (53) and (54) are respectively a resistor and a zener diode for controlling the input voltage to the comparator (52) constant; (55) and (56) are resistors for determining the reference voltage for the comparator (52); (57) and (58) are respectively a capacitor and a resistor connected between the plus (+) input terminal and the output terminal of the comparator (52) for suppressing oscillation thereof; (59) is a resistor connected between the node of the resistor (53) and the resistor (55), and the output terminal of the comparator (52); and (50) is a diode connected between the output terminal of the comparator (52) and the node of the base of the driver transistor (42) and the zener diode (43).

The maximum output under the hot condition (a predetermined value in the range of 20° C. to 120° C.) is guaranteed as a rated output in A.C. generator. The circuit according to the present invention makes a voltage developed across the resistor (51) when the maximum output is generated and feeds that voltage as the rated power for the comparator (52) by way of the resistors (55) and (56).

In the circuit thus configured, when the electric load of a three-phase output winding (1) is so light that the field current value is less than that at the maximum output under the hot condition, the output of the comparator (52) is at "low level", which will give no effect on the field current control by a voltage regulating circuit (4).

On the other hand, under the cold condition, when the field current value exceeds that at the maximum output under the hot condition with the increased electric load, the output of the comparator becomes "high level", which makes a transistor (42) of the voltage regulating circuit conductive to cause a power transistor (41) to turn off so that the field curent is interrupted.

Figure 4:
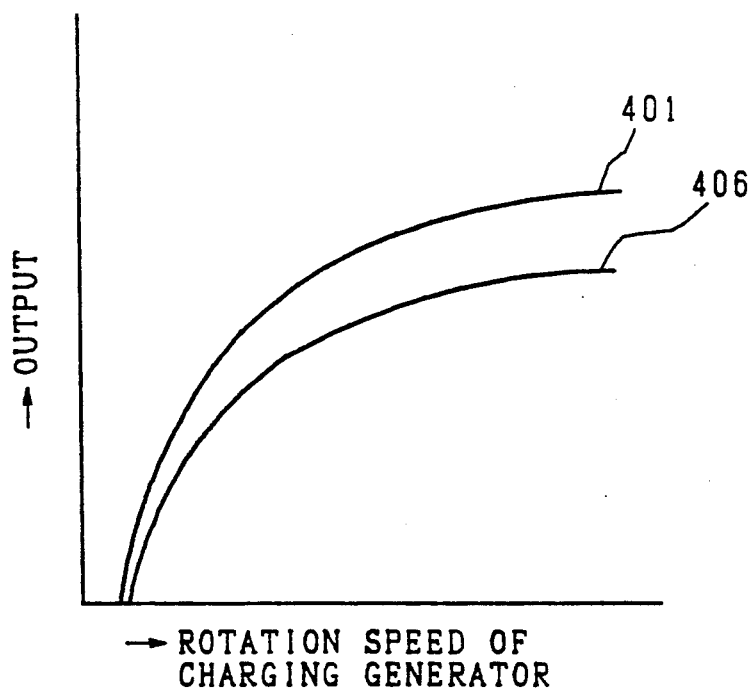
FIG. 4 is a characteristic chart showing an output characteristic of the generator shown in FIG. 3.

By controlling the field current, which is the rated power output to the value at the maximum output under the hot condition with above mentioned operation, the output characteristic and driving torque can be made identical as shown by the curve (406) in FIG. 4 so that the driving torque may be suppressed as in the case under the hot condition, as compared with the case where the field limiting circuit (5) is not provided (curve 406). Thus the load on the engine of a vehicle may be reduced.

In the embodiment thus constructed, since the maximum output of the generator under the cold condition can be made constant, the outer diameter of a pulley driving the generator may be designed to be small enough to prevent the slippage thereof. Generally speaking, the required outer diameter of the pulley is proportional to the square root of the generator output. If the constant output mentioned above is assumed to be 60% of the cold output which is the transition output in the conventional generator, the actual size of the outer diameter of the pulley will be 46.5 mm, and the size of the pulley is about 80% when compared with the conventional generator. All the other pulleys to be coupled with this pulley will also be reduced in size by the ratio of 80% to contribute to the reduction of a vehicle weight. The generator output thus not influenced by the ambient temperature makes an electric system of a vehicle stable and a highly reliable operation without an insufficient output can be expected.

When manufacturers producing such A.C. generators for vehicles in mass production perform their outgoing inspection, it is possible to measure the hot output characteristic, which is the rated power output, one by one in the evaluation of the output characteristic of the generator because of time limitations on their manufacturing operation. Therefore, it is a common practice to evaluate the generator by the cold output characteristic which can be measured in a short period of time. However, in the case of the A.C. generator shown in FIG. 3, the evaluation thereof is not precisely performed since the field current limiting circuit (5) functions to cause the output to become that of the hot condition in the meansurement of the cold output characteristic.

Figure 5:
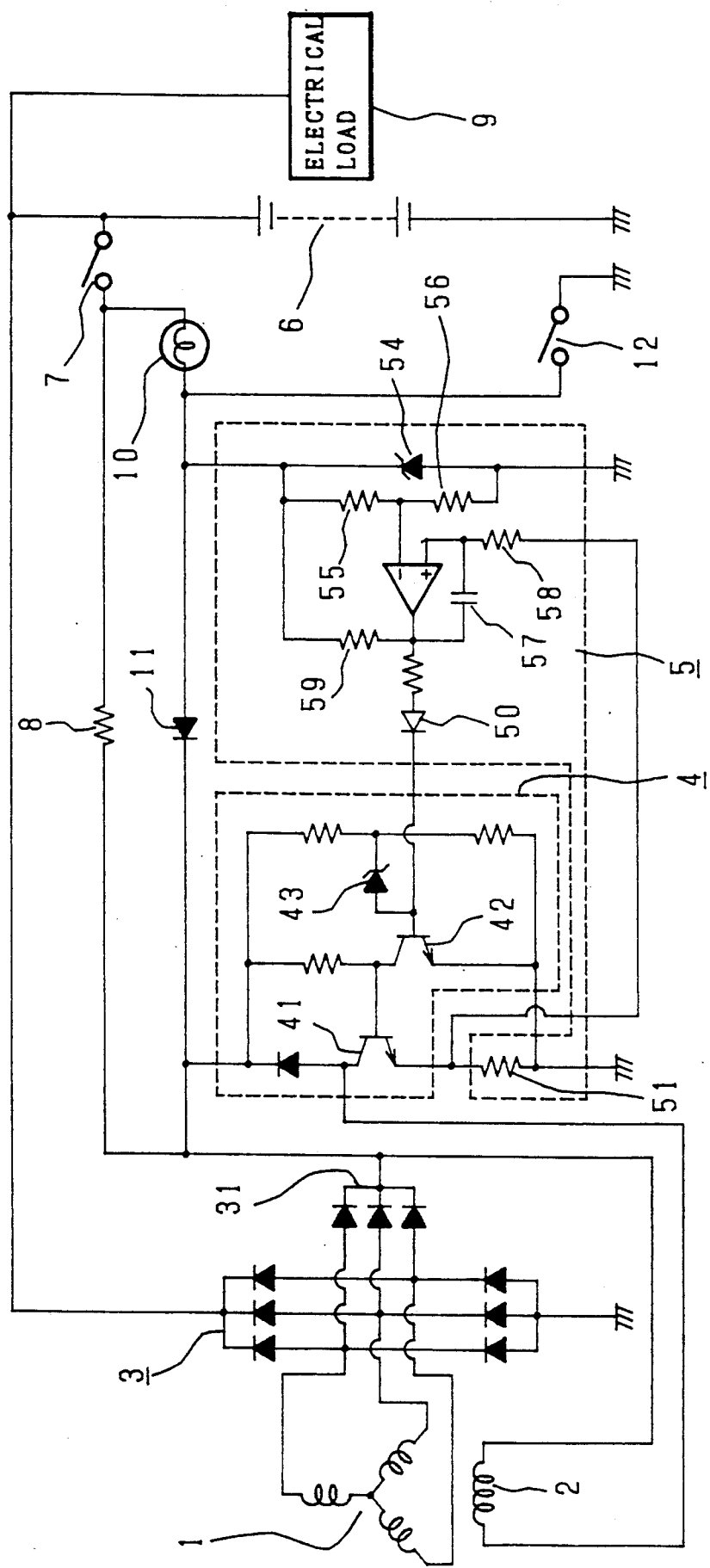
FIG. 5 is a circuit configuration diagram showing an A.C. generator for vehicles another embodiment according to the present invention.

The embodiment shown in FIG. 5 is intended to eliminate such a drawback by selectively inhibiting the function of the field current limiting circuit (5).

In FIG. 5, the reference numeral (6) denotes a battery and (7) is a key switch which connects the battery (6) (through a initial exciting resistor (8) with a voltage regulating circuit (4) and the output terminal of an auxiliary rectifying circuit (31) to feed them operational power. The reference numeral (9) is an electric load fed from the battery (6) and a rectifying circuit (3), and (10) is an indicating lamp which supplies the field winding (2) an exciting current through the key switch (7) and a reverse-current stopping diode (11) for indicating by the lighting thereof that the generator is in a non-generating state. The reference numeral (12) denotes an external switch which composes the main element of this embodiment and is connected to the node of the indicating lamp (10) and the power supply terminal of the field current limiting circuit (5) at its one end, and to ground at the other end thereof.

In the circuit thus configured, when the outgoing inspection of the generator is performed, the field current limiting circuit (5) can be made inoperative by grounding the power supply terminal of the field current limiting circuit (5) through a momentary closure of the external switch (12). Therefore, the output characteristic of the generator under the cold condition (as shown by the curve (401) in FIG. 4) can be obtained as in the case where the field current limiting circuit (5) is not provided. Thus an accurate and effective evaluation of the generator under cold condition can be performed. The lighting of the indicating lamp (10) which occurs at the closure of the switch (12) will show a person in concern that the field current limiting circuit is made inoperative.

Although the above embodiment is configured to ground the power supply terminal of the field current limiting circuit (5) through the external switch (12), the switch (12) can also be inserted in series between the power supply terminal and the indicating lamp (10) to effect the same control operation.

In this case however, the lamp (10) dose not illuminate, so that the release of the field current limiting circuit (5) will not be notified. The lamp (10) is shown to be connected between the key switch (7) and the output termminal of the auxiliary rectifying circuit (31), but this lamp (10) can be also provided independent of the auxiliary rectifying circuit (31) to obtain the same effect.

In addition, although the above embodiment is described as to the effect on the outgoing inspection performed by generator manufacturers, it can be utilized for the generator installed on a vehicle. That is, when the output of an A.C. generator on board is desired to be increased temporarily according to the running and electric load conditions of a vehicle by making the field current limiting circuit (5) inoperative, a control switch provided on the vehicle corresponding to the external switch (12) in operation, which is actuated on and off according to said running and electric load conditions of the vehicle can obtain the aim.

Thus the embodiment last mentioned can make the evaluation of the output characteristic of the generator in the outgoing inspection accurate, and furthermore, it is effective to release the function of the field current limiting circuit (5) in the generator on board.

As described above, the present invention can provide an improved A.C. generator for vehicle of high practical current fed to a field winding to keep the predetermined maximum output characteristic under the hot condition by a field current limiting circuit to result in a reduced vehicle weight and a highly reliable electric system for vehicle. The A.C. generator according to the present invention is also capable of measuring the output characteristic thereof effectively and accurately.

What is claimed is:

1. An alternating current generator for vehicles comprising a field winding, a three-phase output winding for generating an output in response to the exciting current in said field winding, a rectifying circuit for converting the three-phase output of said three-phase output winding into a direct current, a battery to be charged by the output of said rectifying circuit, a voltage regulating circuit for controlling the output voltage of said rectifying circuit to a predetermined value by intermittently controlling the exciting current in said field winding, an indicating lamp connected between said voltage regulating circuit and said battery for indicating the generating or non-generating states of said generator, a field current limiting circuit fed with operating power through said indicating lamp for suppressing the exciting current in said field winding to less than a predetermined value and an external switch connected to said field current limiting circuit for selectively inhibiting the operation of said field current limiting circuit.

2. An alternating current generator as set forth in claim 1, wherein one end of said external switch is connected to the node of said indicating lamp and said field current limiting circuit and the other end thereof is connected ground.

3. An alternating current generator as set forth in claim 1, wherein said external switch is connected between said indicating lamp and said field current limiting circuit in series.

* * * * *